S. E. Tompkins,
Harness Trimming,
Nº 40,653. Patented Nov. 17 1863.
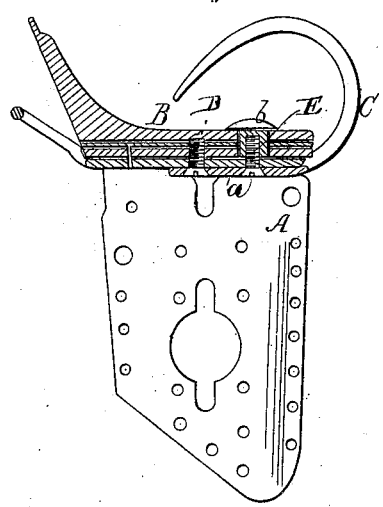
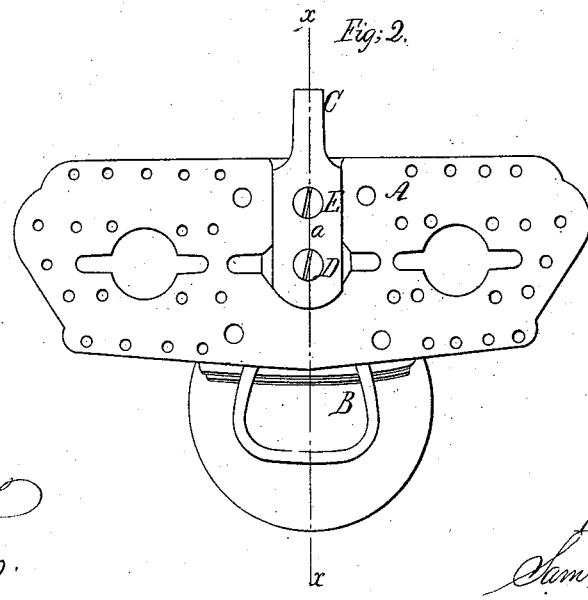
Witnesses.
Inventor.

UNITED STATES PATENT OFFICE.

SAMUEL E. TOMPKINS, OF NEWARK, NEW JERSEY.

IMPROVEMENT IN HARNESS-SADDLES.

Specification forming part of Letters Patent No. 40,653, dated November 17, 1863.

*To all whom it may concern:*

Be it known that I, S. E. TOMPKINS, of Newark, in the county of Essex and State of New Jersey, have invented a new and useful Improvement in Harness-Saddles; and I do hereby declare that the following is a full, clear, and exact description of the same, reference being had to the accompanying drawings, making a part of this specification, in which—

Figure 1 is a side sectional view of my invention, taken in the line $x$ $x$, Fig. 2; Fig. 2, an inverted plan of the same.

Similar letters of reference indicate corresponding parts in the two figures.

This invention relates to a new and improved manner of attaching the check-rein hook to the saddle, whereby the nut which has hitherto been used on the bolt underneath the saddle is dispensed with and the hook at the same time permanently secured to the saddle. This nut has hitherto proved to be a great annoyance, as it injures the horse's back. Various plans have been devised to obviate this difficulty, but none have been adopted, owing to the insecure attachment which has resulted from the change. It is essential that the check-rein hook be firmly secured to the saddle, and also in such a manner as to admit of a broken or injured hook being readily detached, and a new one secured in its place with facility.

To accomplish these ends my invention consists in having the shank of the hook which passes underneath the saddle extended or prolonged, so as to admit of two screws passing through upward from underneath the shank into the under side of the seat, one of the screws, if necessary or desired—the foremost one—passing into a nut fitted into the seat at its upper side.

To enable those skilled in the art to fully understand and construct my invention, I will proceed to describe it.

A represents the cast-metal tree of a harness-saddle, and B the seat thereof. These parts may be constructed in the ordinary or any proper way. C is the check-rein hook, which may be of the usual shape, but its shank, $a$, is considerably longer than usual and extends around the front edge of the center of the tree and backward underneath it a distance about equal to two-thirds of its width. This shank $a$ has two holes made in it to admit of screws D E passing through it, said holes being countersunk at the under side of the shank to receive the heads of the screws and admit of the outer surfaces of the latter being flush with the under side of the shank. The screw D passes upward into the under side of the seat B, while the screw E passes upward into a nut, F, which extends vertically down into the seat, said nut being provided with a head, $b$, which rests or bears on the upper surface of the seat, as shown clearly in Fig. 1. By this arrangement the hook is firmly secured to the tree and also the seat, and without having any projections whatever underneath the tree. Hence the back of the horse cannot be injured or "galled," as it is frequently termed, as is the case with the projecting bolt and nut underneath the tree or saddle, said parts soon wearing a hole through the padding underneath the tree or saddle and coming in contact with the back of the animal.

I would remark that the nut F may be dispensed with, if desired, and the screw E, like D, be made to screw directly into the under side of the seat.

Having thus described my invention, I claim as new and desire to secure by Letters Patent, as an improved article of manufacture—

A harness-saddle having its check-rein hook C secured to it by having its shank $a$ prolonged and extending down around the front end of the saddle and backward underneath the tree A, with two screws, D E, passing upward from underneath the shank $a$ and through countersunk holes therein into the tree, and either with or without the nut F, substantially as described.

SAML. E. TOMPKINS.

Witnesses:
THOS. S. J. DOUGLAS,
D. ROBERTSON.